United States Patent
Rokade et al.

(10) Patent No.: US 12,085,317 B2
(45) Date of Patent: Sep. 10, 2024

(54) SYSTEM AND METHOD OF COOLING OF HEAT GENERATING UNITS IN AN HVAC UNIT

(71) Applicant: Johnson Controls Technology Company, Auburn Hills, MI (US)

(72) Inventors: Dnyaneshwar Rokade, Pune (IN); Suyog K. Gharate, Pune (IN); Amit R. Chothave, Pune (IN); Karan Garg, Jagadhri (IN)

(73) Assignee: TYCO FIRE & SECURITY GMBH, Schaffhausen (CH)

( * ) Notice: Subject to any disclaimer, the term of this patent is extended or adjusted under 35 U.S.C. 154(b) by 277 days.

(21) Appl. No.: 17/235,740

(22) Filed: Apr. 20, 2021

(65) Prior Publication Data

US 2021/0333024 A1    Oct. 28, 2021

(30) Foreign Application Priority Data

Apr. 20, 2020   (IN) .............................. 202011016872

(51) Int. Cl.
  *F25B 31/00*   (2006.01)
  *F24F 1/24*   (2011.01)
  *F24F 1/48*   (2011.01)

(52) U.S. Cl.
  CPC .............. *F25B 31/006* (2013.01); *F24F 1/24* (2013.01); *F24F 1/48* (2013.01)

(58) Field of Classification Search
  CPC ........................................................ F24F 1/24
  See application file for complete search history.

(56) References Cited

U.S. PATENT DOCUMENTS

| | | | | |
|---|---|---|---|---|
| 9,228,771 | B2* | 1/2016 | Kamitani | F24F 1/22 |
| 10,161,650 | B2* | 12/2018 | Davis | F24F 1/22 |
| 10,928,080 | B2* | 2/2021 | Shoemaker | F24F 1/50 |
| 2009/0081940 | A1* | 3/2009 | Jang | F24F 1/50 |
| | | | | 454/184 |
| 2015/0204599 | A1* | 7/2015 | Chisaki | F24F 1/48 |
| | | | | 62/426 |

* cited by examiner

*Primary Examiner* — Christopher R Zerphey
(74) *Attorney, Agent, or Firm* — Fletcher Yoder, P.C.

(57) ABSTRACT

Embodiments of the present disclosure are therefore directed toward a condenser section that is configured to draw an air flow into the condenser section, a control section configured to enclose electrical components, and a partition extending between the condenser section and the control section. The partition may include a first air passage and a second air passage formed therein, where the first air passage is configured to enable a portion of the air flow to flow from the condenser section into the control section to cool the electrical components and the second air passage enables the portion of air flow to from the control section to the condenser section.

20 Claims, 9 Drawing Sheets

SYSTEM AND METHOD OF COOLING OF HEAT GENERATING UNITS IN AN HVAC UNIT

CROSS REFERENCE TO RELATED APPLICATION

This application claims priority from and the benefit of India Provisional Application Serial No. 202011016872, entitled "A SYSTEM AND METHOD OF COOLING OF HEAT GENERATING UNITS IN AN HVAC UNIT," filed Apr. 20, 2020, which is hereby incorporated by reference in its entirety for all purposes.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Heating, ventilation, and/or air conditioning (HVAC) units are utilized in residential, commercial, and industrial environments to control environmental properties, such as temperature and humidity, for occupants of the respective environments. Such systems often are dedicated to either heating or cooling, although systems are common that perform both of these functions. Very generally, these systems operate by implementing a thermal cycle in which fluids are heated and cooled to provide the desired temperature in a controlled space, typically the inside of a residence or building. Many HVAC units may utilize fans, or blowers, in operation. For example, fans may be used for expelling exhaust air, moving air through a heat exchanger, and drawing in return air from a space conditioned by the HVAC unit. The HVAC unit may also include electrical components, such as control boards, power transmission components, variable frequency drives (VFDs), and so forth, disposed within a control section of the HVAC unit. For example, one or more electrical components, such as a VFD, may receive power from a power source and control supply of power to a motors of a fan of the HVAC unit. In this way, the VFD may regulate operation of the fan.

Typically, VFDs generate heat during operation, which may cause an area surrounding the VFDs to increase in temperature. For example, the air surrounding the VFDs may increase in temperature, which may reduce heat dissipation from the VFDs. As will be appreciated, overheating of VFDs may cause the VFDs to operate improperly or inefficiently. Thus, it is desirable to provide cooling to the VFDs. Existing systems may include a separate, dedicated cooling system configured to cool the VFDs to mitigate overheating. However, separate, dedicated cooling systems for the VFDs may be costly to manufacture, assemble, maintain, and/or operate.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a heating, ventilation, and/or air conditioning (HVAC) unit includes a condenser section that includes a coil and a fan, where the fan is configured to draw an air flow into the condenser section. The HVAC unit may also include a control section configured to enclose electrical components of the HVAC unit. Further the HVAC unit may include a partition extending between the condenser section and the control section. The partition may include a first air passage and a second air passage formed therein, where the first air passage is configured to enable a portion of the air flow to flow from the condenser section into the control section, and the second air passage is configured to enable the portion of the air flow to flow from the control section to the condenser section.

In another embodiment, a heating, ventilation, and/or air conditioning (HVAC) unit includes a first section having a heat exchanger and a fan, wherein the fan is configured to draw an air flow into the first section, and a second section configured to enclose electrical components of the HVAC unit. The HVAC unit may also include a partition extending between the first section and the second section, where the HVAC unit comprises an air flow path extending from the first section into the second section via a first opening formed in the partition, through the second section, and from the second section into the first section via a second opening formed in the partition, and wherein the HVAC unit is configured to direct a portion of the air flow along the air flow path.

In a further embodiment, a heating, ventilation, and/or air conditioning (HVAC) unit includes a condenser section having a coil and a fan, where the fan is configured to draw an air flow into the condenser section. The HVAC unit may also include a control section that includes a mounting panel separating the control section into a first portion and a second portion, wherein the mounting panel includes an opening fluidly coupling the first portion and the second portion, and one or more electrical components configured to generate heat during operation, wherein the one or more electrical components are attached to the mounting panel and are disposed within the first portion of the control section Further, the HVAC unit may include a partition extending between the condenser section and the control section, where the partition has a louver configured to direct a portion of the air flow from the condenser section into the first portion of the control section. Additionally, the partition may include a plurality of slats formed therein and configured to direct the portion of the air flow from the second portion of the control section to the condenser section where the fan is configured to draw the portion of the air flow through the control section and draw a remaining portion of the air flow across the coil.

DRAWINGS

Various aspects of the present disclosure may be better understood upon reading the following detailed description and upon reference to the drawings, in which.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As briefly discussed above, a heating, ventilation, and/or air conditioning (HVAC) unit may be used to thermally regulate a space within a building, home, or other suitable structure. The HVAC unit typically includes an enclosure, also referred to herein as an HVAC enclosure, which houses internal components of the HVAC unit, such as a compressor, one or more HVAC controllers, heat exchangers, and/or any other suitable HVAC components. In many cases, the HVAC enclosure supports a condenser, which may be configured to receive a flow of ambient air from the environment surrounding the HVAC unit. In particular, a condenser fan assembly may be coupled to the enclosure and may be configured to draw or force an air flow across a condenser coil (e.g., a heat exchanger). For example, the condenser fan assembly may include a support frame having one or more flow passages formed therein, where the flow passages are in fluid communication with a heat exchange area of the condenser. A fan may be positioned within or adjacent to each of the flow passages and may be operated to force a flow of ambient air across the heat exchange area of the condenser coil and through the flow passages. Accordingly, the condenser fan assembly may facilitate heat transfer between a fluid (e.g., refrigerant) circulating through the condenser coil and an ambient environment, such as the atmosphere.

As noted above, the HVAC enclosure may include a control section that houses or contains components (e.g., electrical components) configured to enable and/or regulate operation of the HVAC unit. For example, the control section may include one or more control boards (e.g., controllers), power transmission components, VFDs, and so forth. The control section may be an enclosed section configured to block ingress of environmental elements (e.g., precipitation, dust, debris, or other matter) in order to protect the electrical components contained therein. In some embodiments, VFDs disposed in the control section of the HVAC unit may control a speed of the condenser fans by controlling amounts and/or characteristics of power provided to motors of the condenser fans. During operation, VFDs may generate heat, which may be rejected to air surrounding the VFDs in the control section. As heat generated by the VFDs is dissipated, the temperature within the control section of the HVAC unit may increase. Thus, it is desirable to reject the heat within the control section to the environment to enable proper operation of the VFDs (e.g., avoid overheating of the VFDs). However, implementation of separate, dedicated cooling systems in the control section may undesirably increase costs associated with manufacturing, operating, and/or maintaining the HVAC unit.

It is now recognized that existing operations and/or functionalities of the HVAC unit may be utilized to also provide cooling to the components within the control section. In particular, an air flow for cooling the components within the control section may be generated via operation of a fan, such as a condenser fan, of the HVAC unit. Condenser fans operate to draw or force an air flow across a condenser coil of the HVAC unit, as discussed above. In accordance with present techniques, the HVAC unit is configured to divert a portion of the air flow induced by the condenser fans from the condenser section to the control section and direct the portion of the air flow across the electrical components within the control section. Operation of the condenser fans may also draw the portion of the air flow from the control section back to the condenser section to discharge the portion of the air flow from the HVAC unit with a remaining portion of the air flow generated by the condenser fans. For example, in some embodiments, the condenser section and the control section of the HVAC unit may be adjacent to one another and may be separated by a partition. The partition may include louvers or other openings configured to intake and/or discharge of the portion of the air flow into and/or from the control section. In this way, the HVAC unit is configured to provide cooling to the components within the control section without a separate and/or dedicated cooling system, which may reduce costs associated with manufacturing, operating, and/or maintaining the HVAC unit.

Figure 1:
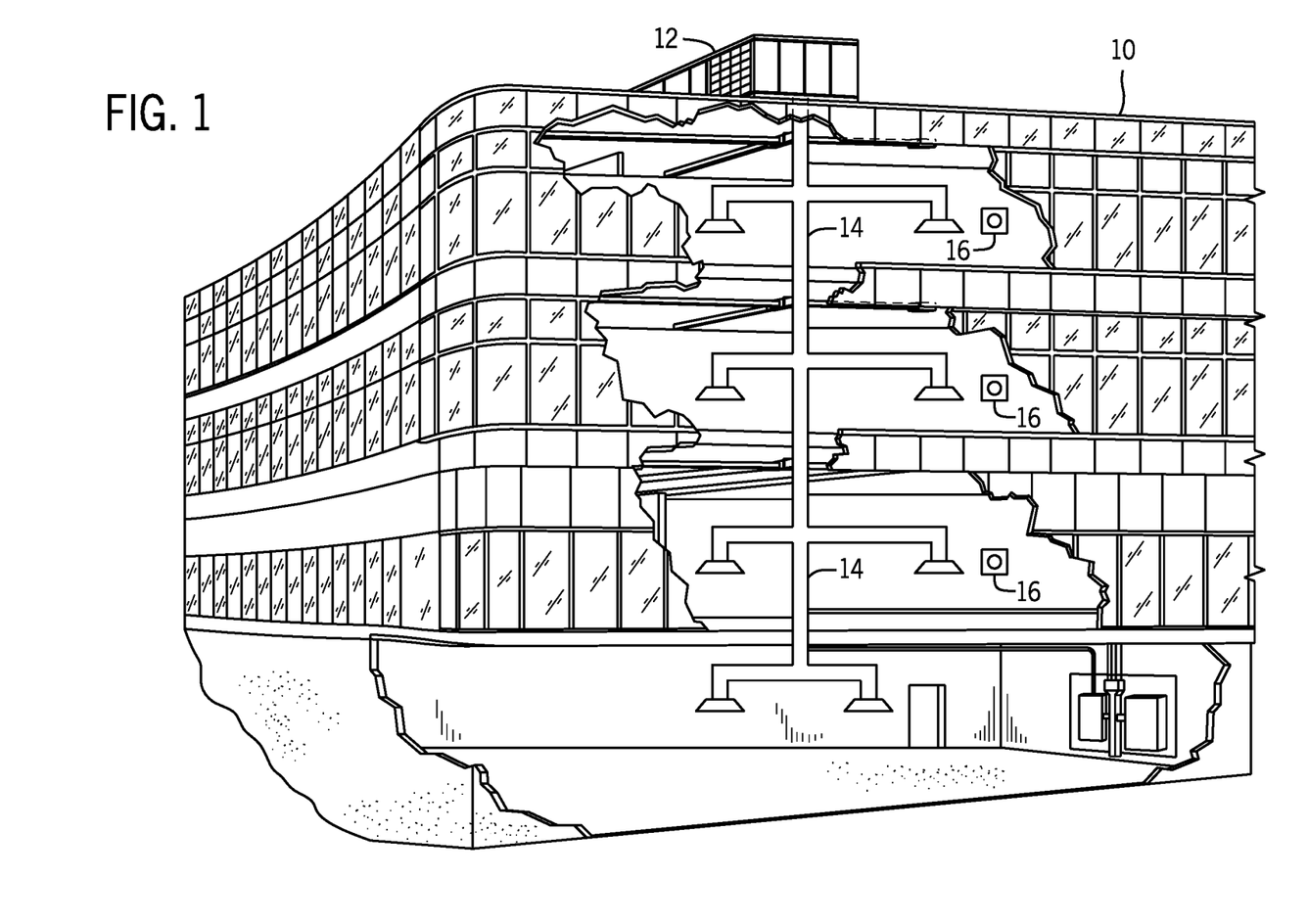
FIG. 1 is a perspective view of an embodiment of a building that may utilize a heating, ventilation, and/or air conditioning (HVAC) system in a commercial setting, in accordance with an aspect of the present disclosure.

Turning now to the drawings, FIG. 1 illustrates an embodiment of a heating, ventilation, and/or air conditioning (HVAC) system for environmental management that may employ one or more HVAC units. As used herein, an HVAC system includes any number of components configured to enable regulation of parameters related to climate characteristics, such as temperature, humidity, air flow, pressure, air quality, and so forth. For example, an "HVAC system" as used herein is defined as conventionally understood and as further described herein. Components or parts of an "HVAC system" may include, but are not limited to, all, some of, or individual parts such as a heat exchanger, a heater, an air flow control device, such as a fan, a sensor configured to detect a climate characteristic or operating parameter, a filter, a control device configured to regulate operation of an HVAC system component, a component configured to enable regulation of climate characteristics, or a combination thereof. An "HVAC system" is a system configured to provide such functions as heating, cooling, ventilation, dehumidification, pressurization, refrigeration, filtration, or any combination thereof. The embodiments described herein may be utilized in a variety of applications to control climate characteristics, such as residential, commercial, industrial, transportation, or other applications where climate control is desired.

In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
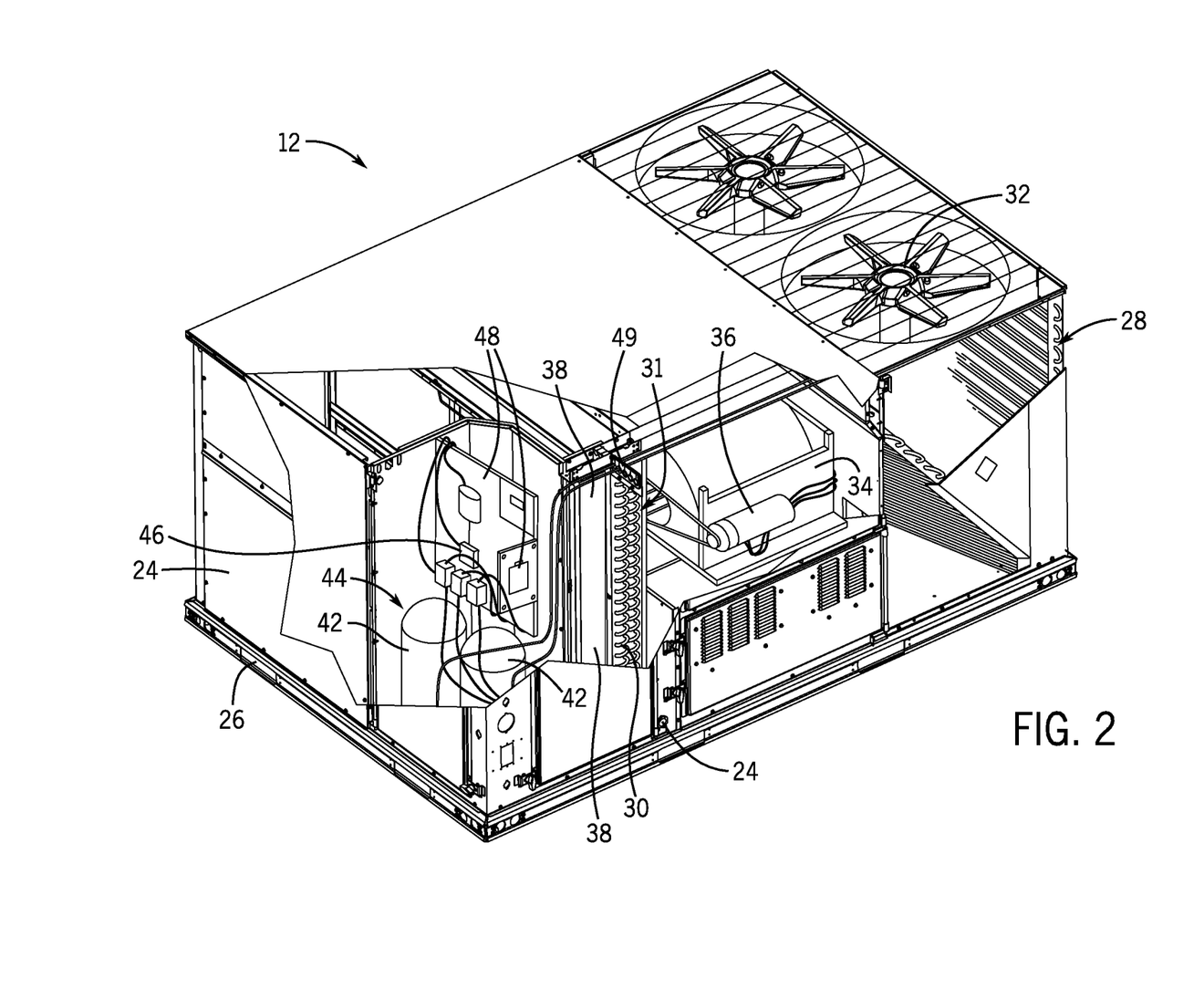
FIG. 2 is a perspective view of an embodiment of a packaged HVAC unit, in accordance with an aspect of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the HVAC unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
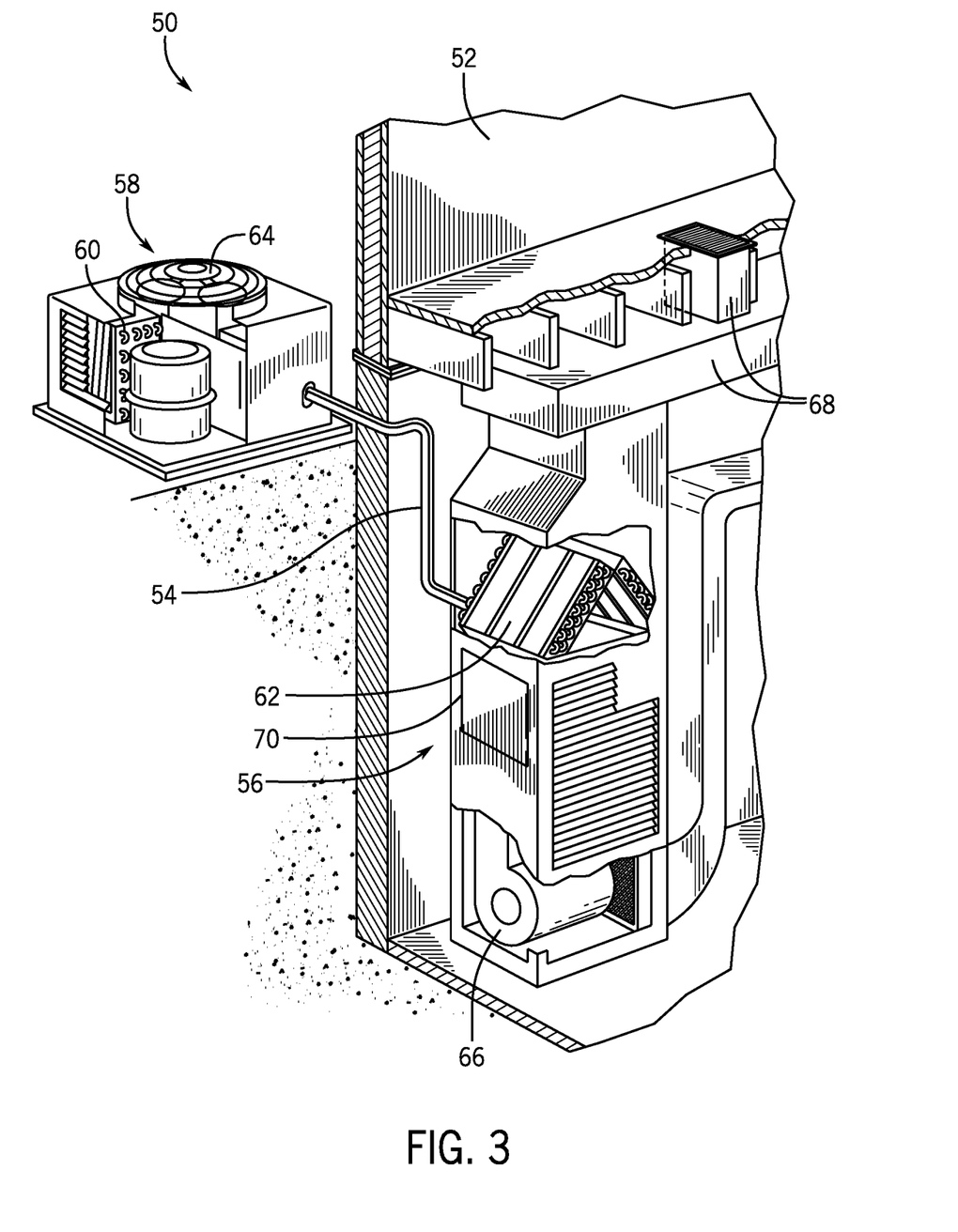
FIG. 3 is a perspective view of an embodiment of a split, residential HVAC system, in accordance with an embodiment of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit 56 functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or a set point plus a small amount, the residential heating and cooling system 50 may become operative to refrigerate additional air for circulation through the residence 52. When the temperature reaches the set point, or a set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over outdoor the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace system 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
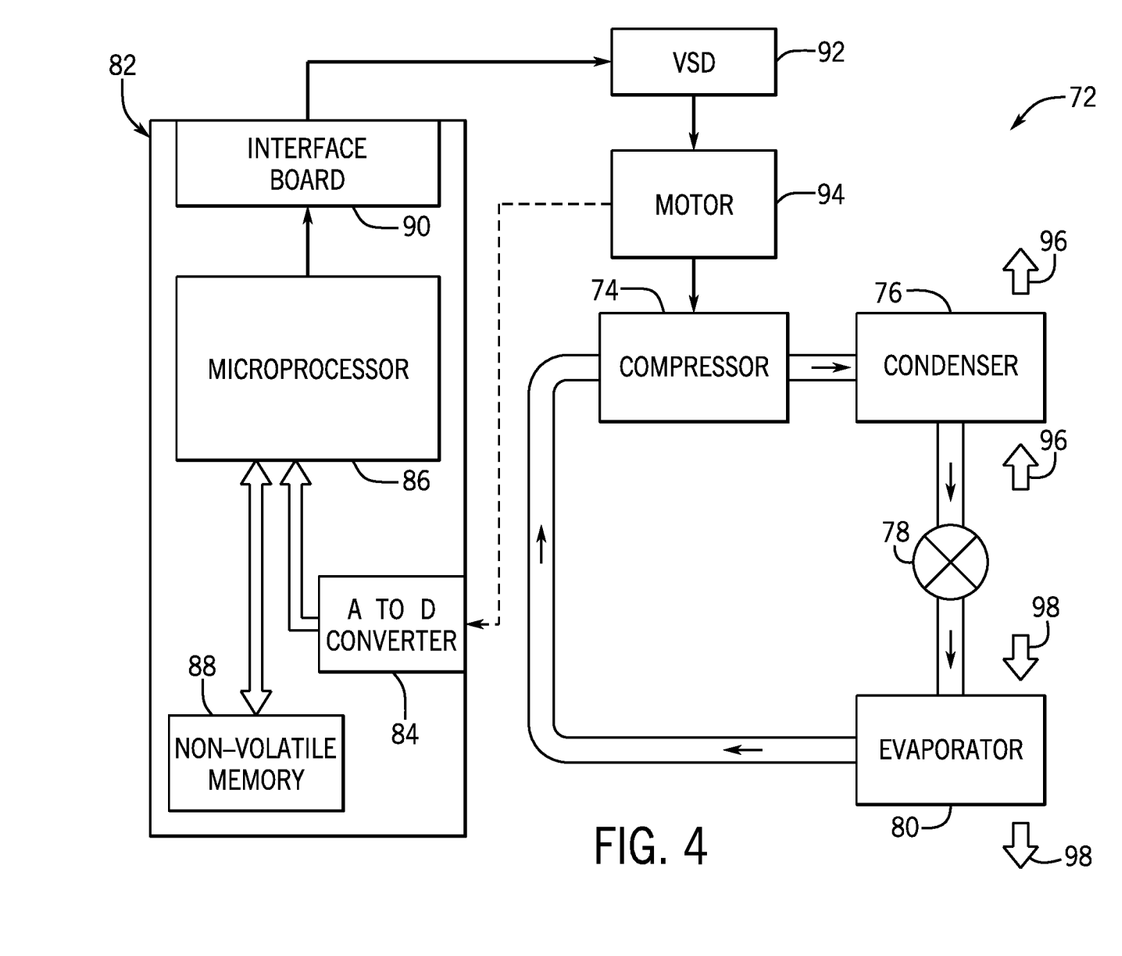
FIG. 4 is a schematic diagram of an embodiment of a vapor compression system that may be used in an HVAC unit, in accordance with an aspect of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

As mentioned above, HVAC units 12 may include a condenser section having one or more condenser fans (e.g., fans 32) that are configured to draw or force an air flow across a condenser (e.g., heat exchanger 28) of the HVAC unit 12. Additionally, HVAC units 12 may include a control section having one or more electrical components (e.g., variable frequency drives (VFDs)) configured to provide power and/or control signals to various components of the HVAC unit 12. In some embodiments, the condenser section may be positioned adjacent to the control section, such as within a common housing or enclosure (e.g., cabinet 24) of the HVAC unit 12. Therefore, electrical connections between the electrical components of the control section and components in the condenser section (e.g., motors of the condenser fans) may be conveniently facilitated.

As mentioned above, electrical components within the control section may generate waste heat during operation, which may increase a temperature of the air within the control section. As the temperature of the air within the control section increases, less heat may dissipate from the electrical components to the surrounding air, which may cause overheating and undesirably affect operation of the electrical components. As a result, it is desirable to provide cooling to the electrical components in order to mitigate overheating and enable proper operation of the electrical components. To this end, embodiments of the present disclosure are directed toward an HVAC unit configured to direct an air flow (e.g., a cooling air flow) through the control section, whereby the air flow absorbs heat rejected by the electrical components. For example, the HVAC unit may include a condenser section, a control section positioned adjacent to the condenser section, and a partition extending between the condenser section and the control section. The condenser section includes a heat exchanger (e.g., a heat exchanger coil, a condenser, etc.) and a fan configured to force an air flow across the heat exchanger, and the control section includes one or more electrical components (e.g., VFD). The partition may include a first air passage and a second air passage formed therein, where the first air passage is configured to enable a portion of the air flow to be directed from the condenser section into the control section to cool the electrical components, and the second air passage is configured to enable the portion of air flow to be directed from the control section to the condenser section. Flow of the portion of the air flow may be induced via operation of the fan of the condenser section, as described below.

Figure 5:
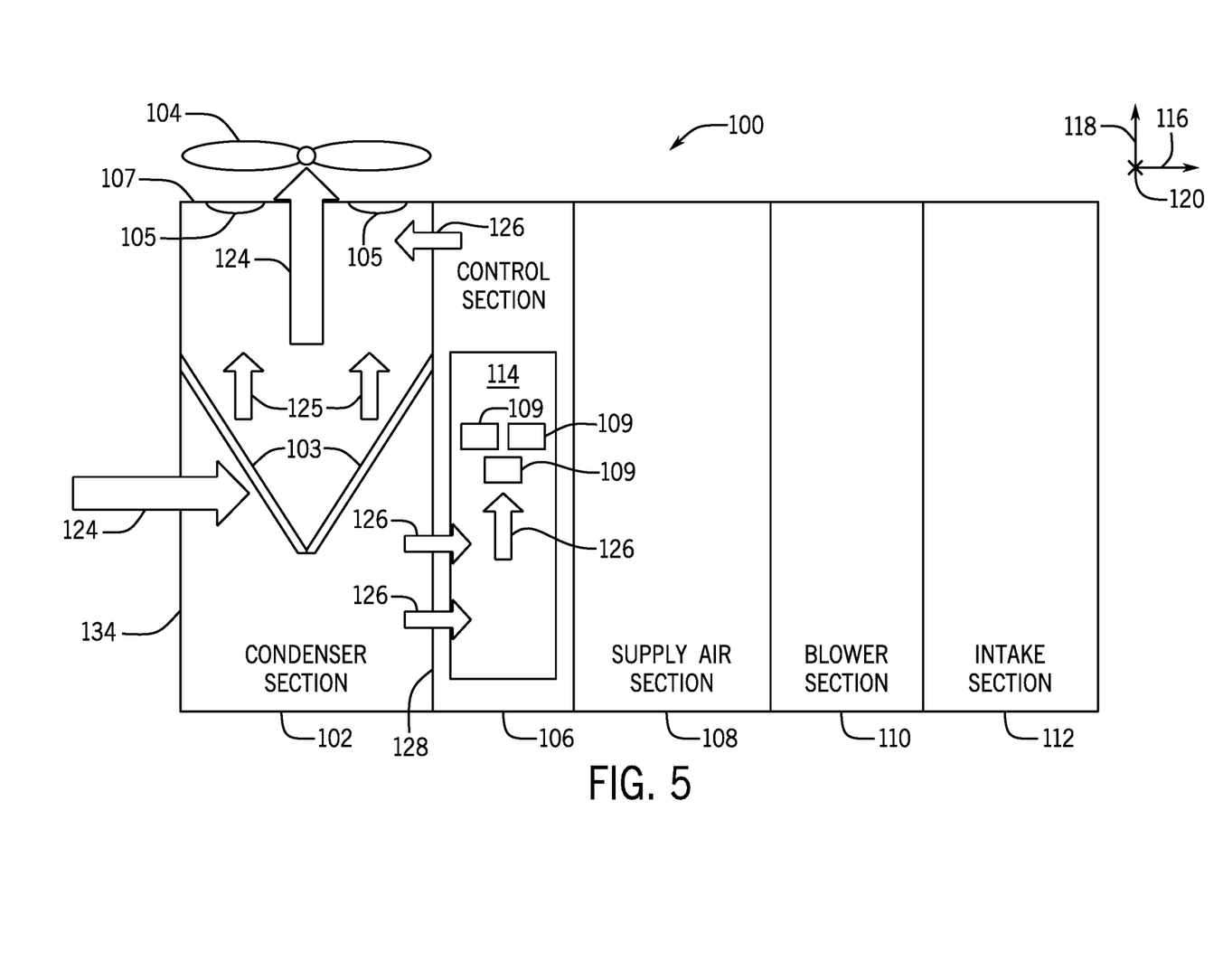
FIG. 5 is a schematic diagram of an embodiment of an HVAC unit, in accordance with an aspect of the present disclosure.

For instance, FIG. 5 is a schematic diagram of an HVAC unit 100 having a condenser section 102, a control section 106, a supply air section 108, a blower section 110, and an intake section 112. For example, the condenser section 102 may include one or more condenser coils 103 (e.g., heat exchanger 28), one or more condenser fans 104 (e.g., fan 32), and one or more air flow outlets 105 disposed at an upper portion of the condenser section 102. The air flow outlets 105 may be formed in a fan deck 107 or other structural panels of the HVAC unit 100. In some embodiments, the condenser fans 104 are positioned within the air flow outlets 105 and are supported by the fan deck 107 and/or other structural panels having the air flow outlets 105. The control section 106 may include one or more electrical components 109 disposed therein, and the electrical components 109 may be configured to control or regulate operation of the HVAC unit 100. For example, one or more of the electrical components 109 may be a VFD configured to regulate an operating speed of the condenser fans 104. As shown, the one or more electrical components 109 may be mounted on or otherwise coupled to a panel 114 (e.g., a mounting panel) disposed within the control section 106.

As will be appreciated, the supply air section 108, the blower section 110, and/or the intake section 112 may include additional components of the HVAC unit 100 configured to enable conditioning of air provided to a conditioned space, such as one or more components described above with reference to FIGS. 2-4. For example, the intake section 112 may be configured to receive an outdoor air flow and/or a return air flow and may include dampers configured to control flow of air into the HVAC unit 100. In some embodiments, the intake section 112 may also include an exhaust outlet configured to discharge the return air flow into the atmosphere. The blower section 110 may include a blower or fan (e.g., blower assembly 34, blower 66) configured to draw a flow of air from the intake section 112 and across a filter and a evaporator (e.g., heat exchanger 30) of the HVAC unit 100 and direct the flow of air into the supply air section 108. In some embodiments, the supply air section 108 may include a heater (e.g., furnace) configured to heat the flow of air. From the supply air section 108, the flow of air may be discharged from the HVAC unit 100 and directed toward a conditioned space serviced by the HVAC unit 100.

It should be noted that the HVAC unit 100 may include embodiments or components of the HVAC unit 12 shown in FIG. 2, embodiments or components of the split, residential heating and cooling system 50 shown in FIG. 3, a rooftop unit (RTU), or any other suitable HVAC unit or HVAC system. For example, as shown in the illustrated embodiment, the condenser section 102, the control section 106, the supply air section 108, the blower section 110, and the intake section 112 may be packaged together in a common housing (e.g., cabinet 24) or support structure. In other embodiments, the various sections and components of the HVAC unit 100 may be arranged in another suitable configuration. To facilitate discussion, the HVAC unit 100 and its components will be described with reference to a longitudinal axis 116, a vertical axis 118, and a lateral axis 120.

As previously mentioned, present embodiments are directed toward the HVAC unit 100 configured to direct an air flow (e.g., a cooling air flow) through the control section 106, whereby the air flow absorbs heat rejected by the electrical components 109. For example, as shown in FIG. 5, an air flow 124, such as an ambient air flow, may be drawn into the condenser section 102 via operation of the condenser fans 104. In the manner described below, a portion 126 of the air flow 124 may flow from the condenser section 102 into the control section 106, such as through an opening (e.g., a louver) in a partition 128 separating the condenser section 102 and the control section 106. Within the control section 106, the portion 126 of the air flow 124 may flow upwards (e.g., along the vertical axis 118) and across the electrical components 109 disposed on the mounting panel 114. In this way, the portion 126 of the air flow 124 may absorb heat rejected by the electrical components 109, thereby cooling the electrical components 109.

After the portion 126 of the air flow 124 flows across the electrical components 109 disposed on the mounting panel 114, the portion 126 of the air flow 124 may flow (e.g., along lateral axis 120) through openings (not shown) formed in the mounting panel 114 and into a cavity within the HVAC unit 100 (e.g., the control section 106) disposed adjacent to the mounting panel 114. The portion 126 of the air flow 124 may then flow through additional openings of the partition 128 and back into the condenser section 102.

While the portion 126 of the air flow 124 is directed from the condenser section 102 and into the control section 106, a remaining portion 125 (e.g., an additional portion) of the air flow 124 is drawn across the condenser coils 103 by the condenser fans 104 to place the remaining portion 125 of the air flow 124 in a heat exchange relationship with a refrigerant circulating through the condenser coils 103. For example, the condenser coils 103 may receive a gaseous refrigerant from a compressor (e.g., compressor 42) of the HVAC unit 100, and heat exchange between the gaseous refrigerant and the remaining portion 125 of the air flow 124 flowing across the condenser coils 103 may cause the gaseous refrigerant to condense into a liquid refrigerant. The remaining portion 125 of the air flow 124 may condense the gaseous refrigerant to a liquid refrigerant when the remaining portion 125 of the air flow 124 passes across the condenser coils 103. The liquid refrigerant may then be circulated to other components of the HVAC unit 100.

After flowing across the condenser coils 103, the remaining portion 125 of the air flow 124, along with the portion 126 of the air flow 124 directed back into the condenser section 102 from the control section 106, may be directed out of the HVAC unit 100. That is, the air flow 124 may be discharged from the HVAC unit 100 through the one or more air flow outlets 105 via the condenser fans 104.

Figure 6:
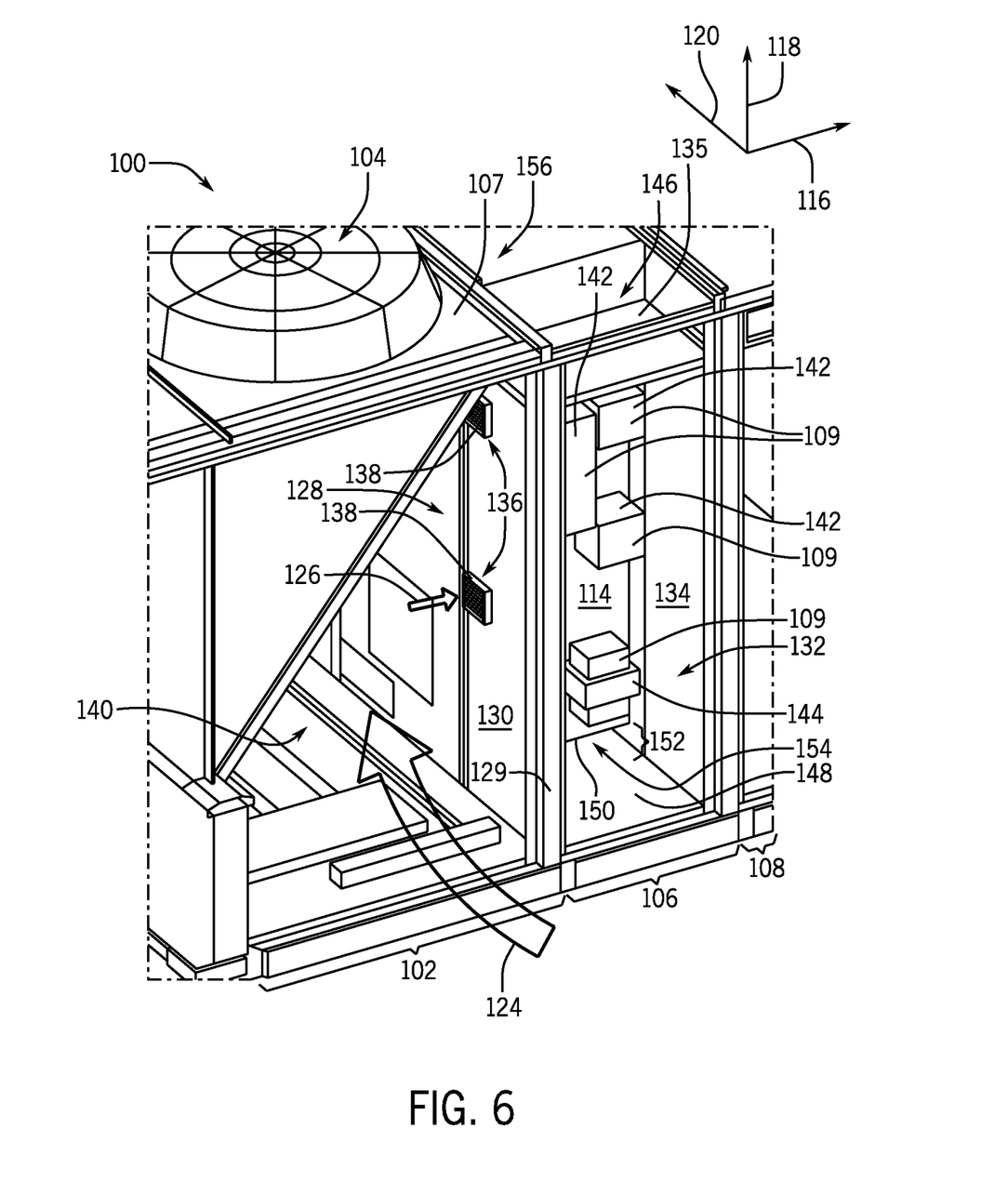
FIG. 6 is a perspective view of an embodiment of a condenser section and a control section of an HVAC unit, in accordance with an aspect of the present disclosure.

FIG. 6 is a perspective view of an embodiment of the HVAC unit 100, illustrating additional features of the HVAC unit 100 that enable cooling of the electrical components 109 via the portion 126 of the air flow 124 from the condenser section 102. As shown in the illustrated embodiment, the partition 128 may laterally extend between the condenser section 102 and the control section 106 to separate the condenser section 102 from the control section 106. For example, the partition 128 may be coupled to a frame 129 (e.g., base rails, side rails, support structure, etc.) of the HVAC unit 100. In some embodiments, the partition 128 is coupled to the frame 129 and/or other structural components to create a barrier between the condenser section 102 and the control section 106 that blocks undesired flow of particles (e.g., precipitation, dust, debris, etc.) from the condenser section 102 to the control section 106 containing the electrical components 109. The partition 128 may be made of any suitable material, such as sheet metal.

The partition 128 may be formed as a single piece component, but in other embodiments the partition 128 may be formed from multiple components (e.g., panels) coupled to one another. For example, in the illustrated embodiment, the partition 128 is formed from multiple panels coupled (e.g., secured, fastened, etc.) to one another. A first panel 130 (e.g., first portion, first sheet, etc.) of the partition 128 is aligned (e.g., along the longitudinal axis 116) with a compartment 132 (e.g., a first portion) of the control section 106 containing the electrical components 109. The compartment 132 of the control section 106 is generally defined as the space (e.g., volume) bound by the first panel 130 of the partition 128, the mounting panel 114, a portion of a panel 134 extending between the control section 106 and the supply air section 108 (e.g., along lateral axis 120), an internal panel 135 of the HVAC unit 100, and an exterior panel (not pictured) of the HVAC unit 100.

The first panel 130 of the partition 128 includes one or more openings 136 (e.g., air passages) formed therein, which form an air flow path between the condenser section 102 and the compartment 132 of the control section 106. Thus, the openings 136 enable the flow of the portion 126 of air flow 124 to flow from the condenser section 102 to the compartment 132. The first panel 130 also includes louvers 138 (e.g., louver units) associated with the openings 136. In other words, each louver 138 may be positioned within, aligned with, and/or be positioned to cover one of the openings 136. The louvers 138 are configured to enable flow of air from the condenser section 102 to the compartment 132 and also block flow of environmental elements, such as precipitation, moisture, dust, debris, and so forth, into the compartment 132 via the openings 136. For example, the louvers 138 may have an ingress protection (IP) rating indicative of a degree of protection provided by the louvers 138 (e.g., to block solid and/or liquid particles from entering the control section 106 via the openings 136). For example, the louvers 138 may have an IP rating of IP54, IP56, or any suitable IP rating. The IP rating selected for the louvers 138 may depend on expected environmental conditions surrounding the HVAC unit 100 and/or a geographic location of the HVAC unit 100 when installed. As will be appreciated, the louvers 138 enable protection of the electrical components 109 within the compartment 132 from environmental elements (e.g., moisture) that may enter the condenser section 102 while also enabling passage of the portion 126 of the air flow 124 therethrough to provide cooling to the electrical components 109.

As mentioned above, present embodiments enable cooling of the electrical components 109 via the air flow 124 induced during operation of the HVAC unit 100 (e.g., operation of the condenser fans 104). During operation, the condenser fans 104 draw the air flow 124 into the condenser section 102, such as though an opening 140 of the condenser section 102. As the air flow 124 flows into the condenser section 102, a pressure differential may be generated between the condenser section 102 and the control section 106 (e.g., the compartment 132). In particular, a pressure within the condenser section 102 may be greater than a pressure within the control section 106. The pressure differential may induce the portion 126 of the air flow 124 to flow through the louvers 138 and the openings 136 and into the compartment 132.

Within the compartment 132, the portion 126 of the air flow 124 may contact and/or flow across the electrical components 109 to cool the electrical components 109 via convection. As mentioned above, the electrical components 109 may include variable frequency drives (VFDs) 142, variable speed drives (VSDs), transformers 144, control boards, and/or other electrical components configured to enable and/or control operation of the HVAC unit 100. For example, the VFDs 142 may be utilized to control a speed of the condenser fans 104, a blower (e.g., blower 66), a compressor, or other component of the HVAC unit 100. The transformer 144 may be configured to receive, condition, and/or provide electrical current to components of the HVAC unit 100.

In operation, the electrical components 109 generate heat, which may increase a temperature within the compartment 132 (e.g., an air temperature within the compartment 132). The portion 126 of air flow 124 may be circulated through the compartment 132 to reduce an overall temperature within the compartment 132, thereby providing further cooling to the electrical components 109. For example, higher temperature air within the compartment 132 may rise (e.g., along the vertical axis 118) and exit the compartment 132, as described in further detail below, and may be replaced by the portion 126 of the air flow 124 entering the compartment 132 via the openings 136 and the louvers 138. The air within the compartment 132 may be continuously replaced as the portion 126 of the air flow 124 continuously flows into the compartment 132. In this way, temperatures of the electrical components 109 and an overall temperature within the compartment 132 may be reduced to enable improved and/or desirable operating temperatures of the electrical components.

In the illustrated embodiment, the control section 106 further includes a passage 146, disposed vertically above the mounting panel 114 (e.g., relative to vertical axis 118) and extending from the condenser section 102 to the supply air section 108. The passage 146 may be configured to accommodate other components of the HVAC unit 100, such as conduits extending between the condenser coils 103 and an evaporator (e.g., positioned within or adjacent the blower section 110) of the HVAC unit 100 that are configured to circulate refrigerant therethrough.

Further, the mounting panel 114 does not extend (e.g., along the vertical axis 118) to contact a base 148 (e.g., base panel) of the control section 106. Instead, a lower edge 150 of the mounting panel 114 is offset from the base 148 of the control section 106 by a height 152. Thus, a passageway 154 (e.g., a gap, a space, an opening, etc.) is formed that extends (e.g., along lateral axis 120) to a cavity 156 (e.g., a second portion of the control section 106) within the HVAC unit 100 that is on a side of the mounting panel 114 opposite the compartment 132. In other words, the passageway 154 fluidly couples the compartment 132 and the cavity 156. The portion 126 of air flow 124 within the compartment 132 may flow into the cavity 156 through the passageway 154, openings formed in the mounting panel 114 above (e.g., relative to vertical axis 118) the electrical components 109, or both. Additionally or alternatively, the passageway 154 may be utilized to route wiring that is communicatively coupled to and extends between the electrical components 109 disposed on the mounting panel 114 and other components of the HVAC unit 100. The directionality of the portion 126 of the air flow 124 within the control section 106 and additional features of the mounting panel 114 are discussed in further detail below.

Figure 7:
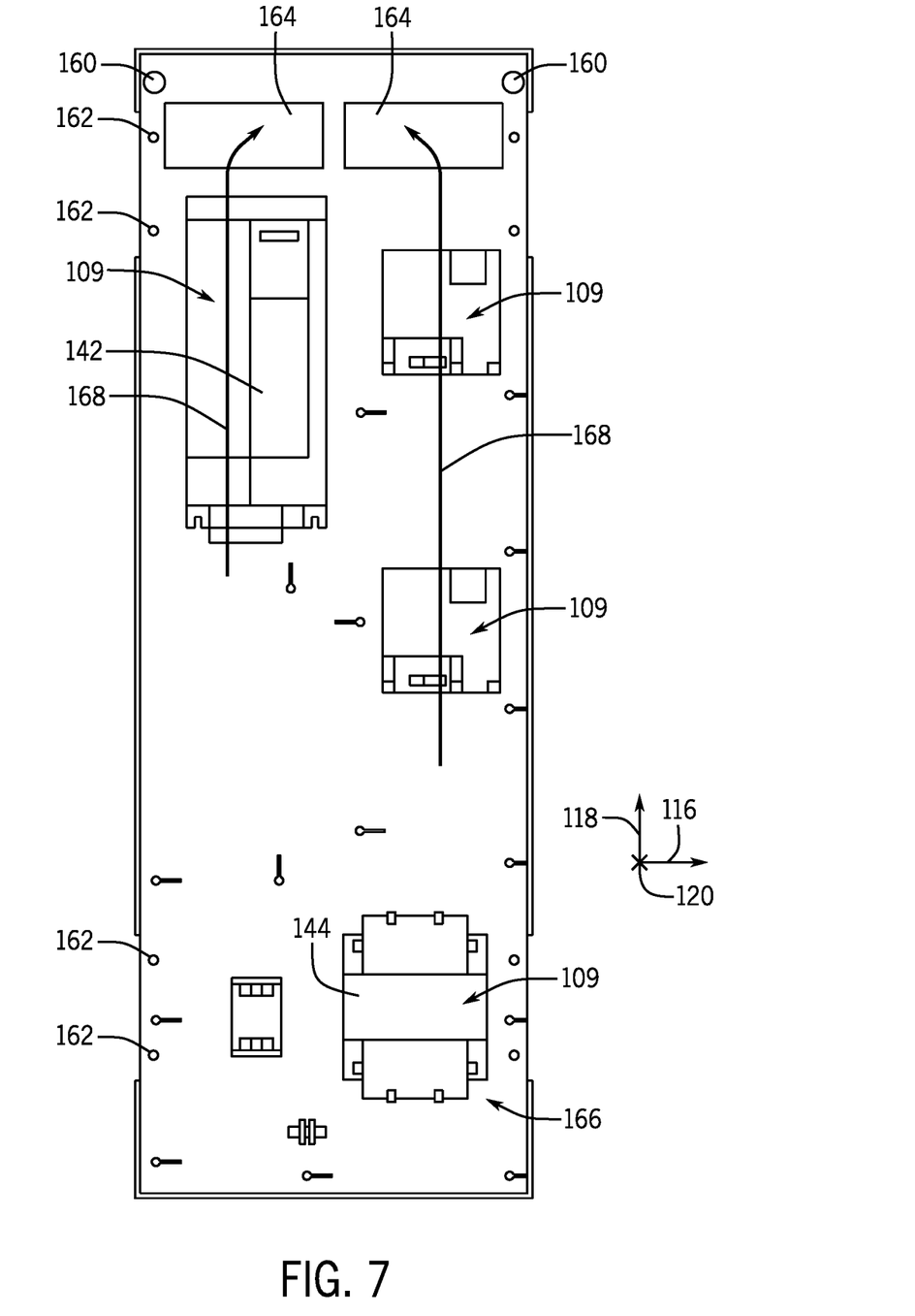
FIG. 7 is a side view an embodiment of a mounting panel of a control section of an HVAC unit, in accordance with an aspect of the present disclosure.

FIG. 7 is a perspective view of an embodiment of the mounting panel 114. As previously discussed, electrical components 109 of the HVAC unit 100 may be disposed on (e.g., mounted to, supported by, etc.) the mounting panel 114. For example, the VFDs 142 and the transformer 144 may be mounted on the mounting panel 114. It should be noted that the mounting panel 114 may include fewer or more electrical components 109 than shown in FIG. 7, different types of electrical components 109, and/or other non-electrical components. The mounting panel 114 may further include holes 160 (e.g., apertures, openings, etc.) formed therein. The holes 160 may be utilized to route wiring from the electrical components 109 to other components of the HVAC unit 100. In some embodiments, the holes 160 may enable the mounting of the mounting panel 114 within the control section 106. For example, the mounting panel 114 may be mounted to the frame 129 of the HVAC unit 100, panels of the HVAC unit 100, and/or another components (e.g., structural components) of the HVAC unit 100. In some embodiments, nut and bolt configurations, screws, or any suitable mechanical fastener may extend through the holes 160, other apertures 162 formed in the mounting panel 114, and/or through another component (e.g., the frame 129) of the HVAC unit 100 to secure the mounting panel 114 within the HVAC unit 100. However, in other embodiments, other suitable techniques (e.g., welding, brazing, adhesives, etc.) may be utilized to secure the mounting panel 114 within the HVAC unit 100. The VFDs 142, the transformer 144, and/or other electrical components 109 may be mounted to the mounting panel 114 utilizing any suitable technique or feature, such as mechanical fasteners, brazing, and so forth.

As noted above, the mounting panel 114 may include openings 164 formed therein that are configured to enable the portion 126 of air flow 124 to flow from an exterior facing side 166 of the mounting panel 114 (e.g., from within the compartment 132) into the cavity 156. The openings 164 may be the same shape and size as one another or may have different sizes and/or shapes. As mentioned above, air within the compartment 132 may flow across the electrical components 109 and absorb heat rejected by the electrical components 109. The heated air may rise within the compartment 132 (e.g., along vertical axis 118) and exit the compartment 132 via the openings 164 to enter the cavity 156, as indicated by arrows 168. However, as noted above, the portion 126 of the air flow 124 may also flow from the compartment 132 into the cavity 156 via the passageway 154.

The heat generated by the VFDs 142, the transformer 144, and/or other electrical components 109 in the compartment 132 may cause an increase in pressure of the portion 126 of air flow 124. As a result, a pressure difference may be generated between the compartment 132 (e.g., the portion 126 of the air flow 124) and the cavity 156. That is, the pressure in the compartment 132 may be greater than the pressure in the cavity 156. The pressure difference may force the portion 126 of air flow 124 to flow from the compartment 132 into the cavity 156. This effect may enable and/or enhance circulation of the portion 126 of the air flow 124 through the control section 106 (e.g., from the compartment 132 to the cavity 156) without the use of a separate exhaust fan system to circulate the portion 126 of the air flow 124.

Figure 8:
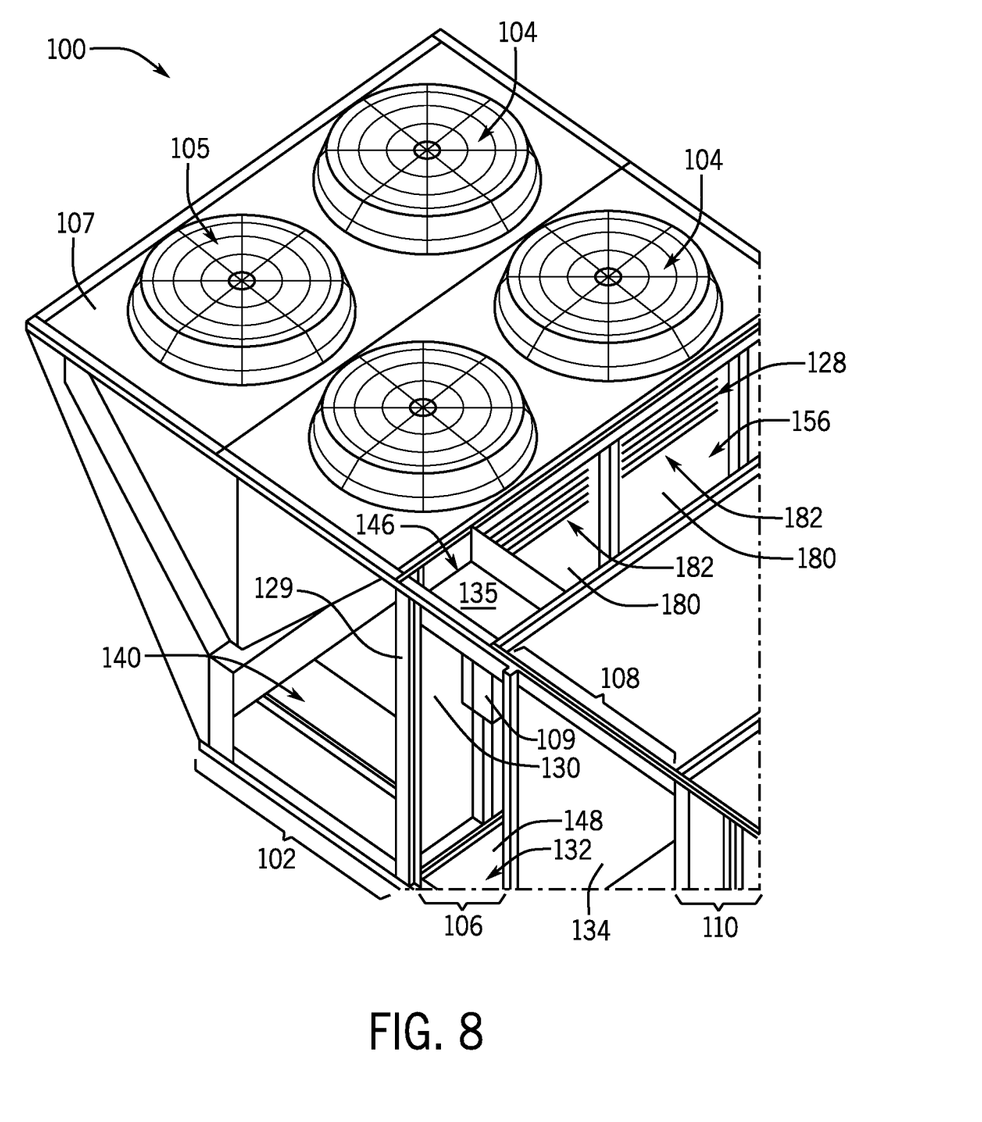
FIG. 8 is a perspective view of an embodiment of an HVAC unit, illustrating a condenser section and a control section, in accordance with an aspect of the present disclosure.

FIG. 8 is a perspective of a portion of an embodiment of the HVAC unit 100, illustrating the condenser section 102 and the control section 106. A top panel of the HVAC unit 100 is removed to show the cavity 156 within the HVAC unit 100. As shown, in addition to the first panel 130, the partition 128 also includes one or more additional panels 180 that extend between the control section 106 and the condenser section 102. For example, one additional panel 180 may extend from the first panel 130 to a side of the HVAC unit 100 opposite the first panel 130, or multiple additional panels 180 (e.g., two, three, four, or more panels) may be coupled to one another to form a remainder of the partition 128. The additional panels 180 may be made of similar, or the same, material as the first panel 130 (e.g., sheet metal). The additional panels 180 of the partition 128 may also include a plurality of slats 182 (e.g., louvers, slots, openings, air passages, etc.) formed therein to fluidly couple the cavity 156 with the condenser section 102. Thus, the plurality of slats 182 is configured to enable air flow from the cavity 156 into the condenser section 102. The plurality of slats 182 may be stationary (e.g., non-actuatable) to maintain an air flow path between the cavity 156 and the condenser section 102. However, in other embodiments, the plurality of slats 182 may be adjustable (e.g., manually and/or automatically).

The portion 126 of air flow 124 may be drawn back into the condenser section 102 via operation of the condenser fans 104. For example, the condenser fans 104 may create a suction force that draws the air flow 124 out of the HVAC unit 100 via the air flow outlets 105. As discussed above, the condenser fans 104 may draw the air flow 124 through the condenser section 102 and across the condenser coils 103 and then discharge the air flow 124 via the air flow outlets 105. Additionally, the suction force created by the condenser fans 104 may also draw the portion 126 of air flow 124 out of the cavity 156 into the condenser section 102. In this way, a suction force may also be generated in the control section 106 by the condenser fans 104. Specifically, as the portion 126 of the air flow 124 is drawn out of the control section 106, the suction force may further draw more of the portion 126 of the air flow 124 from the compartment 132 into the cavity 156 and from the condenser section 102 into the compartment 132 (e.g., via the louvers 138), thereby providing circulation of the portion 126 of the air flow 124 through the controls section 106 along an air flow path including the openings 136 (e.g., louvers 138), the compartment 132, the openings 164, the cavity 156, and the plurality of slats 182.

The portion 126 of the air flow 124 exiting the control section 106 may be combined with the air flow 124 within the condenser section 102 and may be expelled from the HVAC unit 100 via the air flow outlets 105. In this way, the condenser fans 104 may be operated to provide cooling (e.g., via the air flow 124) to the condenser coils 103 and also do the electrical components 109 within the control section 106. In other words, the condenser fans 104 operate to provide cooling to the electrical components 109 (e.g., via the louvers 138, the openings 164, and the plurality of slats 174) without utilization of a separate, dedicated cooling system (e.g., separate fans) for the control section 106.

Figure 9:
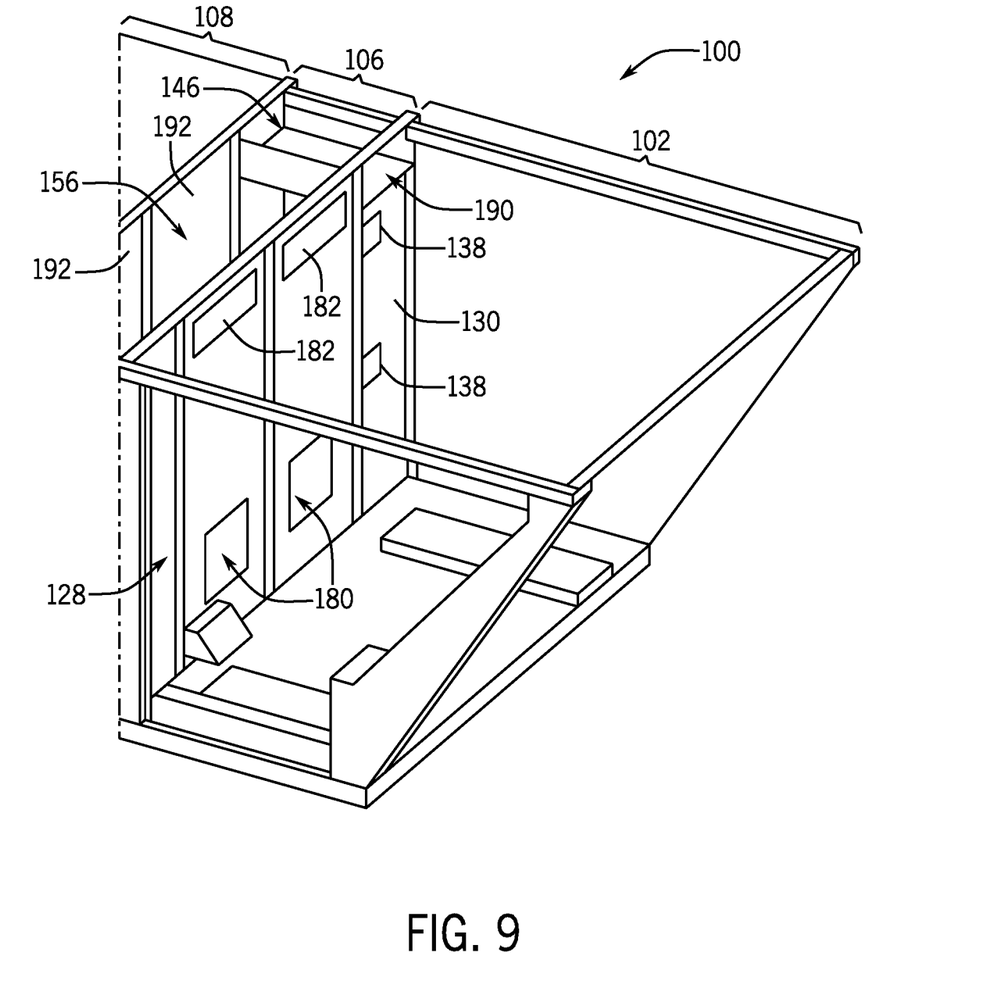
FIG. 9 is a perspective view of an embodiment of a condenser section of an HVAC unit, in accordance with an aspect of the present disclosure.

FIG. 9 is a perspective view of an embodiment of the control section 106 and the condenser section 102 with the condenser coils 103, condenser fans 104, and fan deck 107 removed in order to better illustrate the partition 128 and the features thereof. For example, the first panel 130 of the partition 128, the additional panels 180 of the partition 128, the one or more louvers 138, and the plurality of slats 182 are shown in the illustrated embodiment. The passage 146 is also shown with an opening 190 configured to enable conduits from the condenser coils 103 to traverse the control section 106 to other components of the HVAC unit 100. Additionally, the cavity 156 is partially shown. It should be noted that the cavity 156 may be further defined as a space or volume extending between the additional panels 180 of the partition 128, the base 148, and one or more panels 192 extending between the control section 106 and the supply air section 108. While the mounting panel 114 is not shown in the illustrated embodiment, the mounting panel 114 may also serve as a boundary of the cavity 156, as discussed above. On a side 194 of the HVAC unit 100 opposite the compartment 132, there may be one or more additional compartments (e.g., similar to compartment 132) of the control section 106 that are configured to support one or more electrical components 109 or other components of the HVAC unit 100. The additional compartment may include a mounting panel similar to mounting panel 114 that also serves as a boundary of the cavity 156.

Accordingly, present embodiments are directed to an HVAC unit configured to provide an air flow for cooling electrical components within a control section. For example, the air flow may be generated via operation of a fan, such as a condenser fan, of the HVAC unit. In addition to providing cooling to condenser coils via the condenser fan and the air flow, the HVAC unit is configured to divert a portion of the air flow from a condenser section to the control section and direct the portion of the air flow across the electrical components within the control section. Operation of the condenser fans may also draw the portion of the air flow from the control section back to the condenser section to discharge the portion of the air flow from the HVAC unit with a remaining portion of the air flow generated by the condenser fans that is drawn across the condenser coils. In this way, the HVAC unit is configured to provide cooling to the electrical components within the control section without a separate and/or dedicated cooling system, which may reduce costs associated with manufacturing, operating, and/or maintaining the HVAC unit.

While only certain features and embodiments of the present disclosure have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described (i.e., those unrelated to the presently contemplated best mode of carrying out the present techniques, or those unrelated to enabling the claimed features). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A heating, ventilation, and/or air conditioning (HVAC) unit, comprising:
    a condenser section comprising a coil and a fan, wherein the fan is configured to draw an air flow into the condenser section;
    a control section configured to enclose electrical components of the HVAC unit; and
    a partition extending between the condenser section and the control section, wherein:
        the partition comprises a first air passage and a second air passage formed therein,
        the first air passage is configured to enable a portion of the air flow to flow from the condenser section into the control section,
        the second air passage is configured to enable the portion of the air flow to flow from the control section to the condenser section,
        the first air passage is lower than the second air passage relative to a vertical axis, and
        the fan is configured to draw the portion of the air flow from the condenser section and through the control section and to draw a remaining portion of the air flow within the condenser section, separate from the portion of the air flow, across the coil.

2. The HVAC unit of claim 1, wherein the fan is configured to draw the portion of the air flow from the condenser section and into the control section via the first air passage and from the control section into the condenser section via the second air passage.

3. The HVAC unit of claim 2, wherein the coil is configured to circulate a refrigerant therethrough, and the fan is configured to discharge the portion of the air flow and the remaining portion of the air flow from the condenser section via an air flow outlet.

4. The HVAC unit of claim 1, comprising a variable frequency drive (VFD) disposed within the control section.

5. The HVAC unit of claim 4, comprising a mounting panel disposed within the control section, wherein the VFD is secured to the mounting panel.

6. The HVAC unit of claim 5, wherein the control section comprises a first portion and a second portion, the mounting panel extends between the first portion and the second portion, and the VFD is secured to the mounting panel within the first portion.

7. The HVAC unit of claim 6, wherein the mounting panel comprises an opening fluidly coupling the first portion and the second portion, and wherein the second air passage fluidly couples the second portion and the condenser section.

8. The HVAC unit of claim 7, wherein the VFD is secured to the mounting panel beneath the opening relative to a direction of gravity.

9. The HVAC unit of claim 1, comprising an ingress protected (IP) rated louver coupled to the partition, wherein the first air passage extends through the IP rated louver.

10. The HVAC unit of claim 1, wherein the partition comprises a plurality of louvers formed therein, and the second air passage extends through the plurality of louvers.

11. A heating, ventilation, and/or air conditioning (HVAC) unit, comprising:
    a first section comprising a heat exchanger and a fan, wherein the fan is configured to draw an air flow into the first section;
    a second section adjacent to the first section and configured to enclose electrical components of the HVAC unit; and
    a partition extending between the first section and the second section,
    wherein the HVAC unit comprises an air flow path extending from the first section into the second section via a first opening formed in the partition, through the second section, and from the second section into the first section via a second opening formed in the partition, wherein the first opening is lower than the second opening relative to a vertical axis, and wherein the HVAC unit is configured to direct a portion of the air flow along the air flow path and to direct a remaining portion of the air flow within the first section, separate from the portion of the air flow, across the heat exchanger.

12. The HVAC unit of claim 11, comprising a louver coupled to the partition adjacent to the first opening, wherein the air flow path extends through the louver.

13. The HVAC unit of claim 12, wherein the louver is an ingress protected (IP) rated louver.

14. The HVAC unit of claim 11, wherein the electrical components comprise a variable frequency drive (VFD), a transformer, or both.

15. The HVAC unit of claim 14, comprising the VFD disposed within the second section, wherein the VFD is configured to regulate operation of the fan.

16. The HVAC unit of claim 11, comprising a mounting panel disposed within the second section, wherein the second section comprises a compartment configured to enclose the electrical components on a first side of the mounting panel and comprises a cavity on a second side of the mounting panel.

17. The HVAC unit of claim 16, wherein the air flow path extends from the first section into the compartment via the first opening, and the air flow path extends from the cavity into the first section via the second opening.

18. The HVAC unit of claim 17, wherein a lower edge of the mounting panel is offset from a base of the second section to define a passageway from the compartment to the cavity, and wherein the mounting panel comprises an opening formed therein at an end of the mounting panel opposite the lower edge.

19. A heating, ventilation, and/or air conditioning (HVAC) unit, comprising:
    a condenser section comprising a coil and a fan, wherein the fan is configured to draw an air flow into the condenser section;
    a control section, comprising:

a mounting panel separating the control section into a first portion and a second portion, wherein the mounting panel comprises an opening fluidly coupling the first portion and the second portion; and one or more electrical components configured to generate heat during operation, wherein the one or more electrical components are attached to the mounting panel and are disposed within the first portion of the control section; and a partition extending between the condenser section and the control section, wherein the partition comprises a louver configured to direct a portion of the air flow within the condenser section into the first portion of the control section, and the partition comprises a plurality of slats formed therein and configured to direct the portion of the air flow from the second portion of the control section to the condenser section, wherein the louver is lower than the plurality of slats relative to a vertical axis, and the fan is configured to draw the portion of the air flow from the condenser section and through the control section and to draw a remaining portion of the air flow within the condenser section, separate from the portion of the air flow, across the coil.

20. The HVAC unit of claim 19, wherein the one or more electrical components comprise a variable frequency drive (VFD) configured to regulate operation of the fan, and the louver comprises an ingress protected (IP) rated louver.

\* \* \* \* \*